United States Patent

[11] 3,590,674

| [72] | Inventors | Teizo Maeda<br>30-12, 2-Chome, Kohyunata, Bunkyo-ku;<br>Takeo Nakagawa, 21-44 5-Chome, Kami-<br>Saginomiya, Nakano-ku, both of Tokyo,<br>Japan |
|---|---|---|
| [21] | Appl. No. | 766,524 |
| [22] | Filed | Oct. 10, 1968 |
| [45] | Patented | July 6, 1971 |
| [32] | Priority | Oct. 12, 1967 |
| [33] | | Japan |
| [31] | | 42/165174 |

[54] RESTRAINED SHEARING METHOD OF BAR MATERIAL
1 Claim, 18 Drawing Figs.

[52] U.S. Cl. .................................................. 83/14,
83/454, 83/456, 83/580, 83/620, 83/694
[51] Int. Cl. ...................................................... B23d 15/04

[50] Field of Search........... ..... ..................... 83/14, 42,
453, 454, 580, 282, 375—390, 19, 268, 269, 694,
456, 620

[56] References Cited
UNITED STATES PATENTS

| 2,039,842 | 5/1936 | Howland-Shearman.... | 83/14 X |
| 3,039,344 | 6/1962 | Hercik.......................... | 83/390 X |
| 3,082,655 | 3/1963 | Voigt............................ | 83/580 X |
| 3,204,504 | 9/1965 | Bradlee ....................... | 83/382 X |
| 3,252,364 | 5/1966 | Veres et al.................... | 83/14 |
| 3,451,298 | 6/1969 | Schaming.................... | 83/387 X |

*Primary Examiner*—James M. Meister
*Attorney*—George B. Oujevolk

ABSTRACT: Method of shearing bar material workpiece by holding the bar workpiece at positions adjacent to the point of shearing so as to restrain axial movement while pressure shearing by vertical movement against the axis of the workpiece.

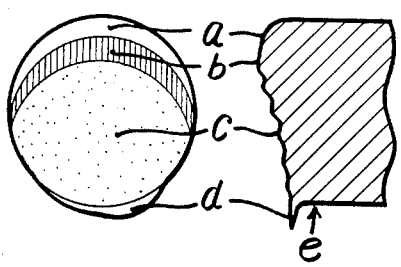
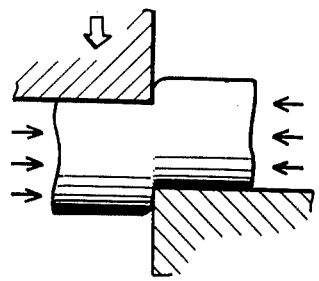
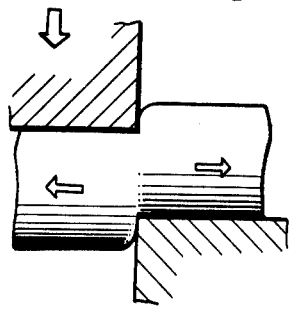
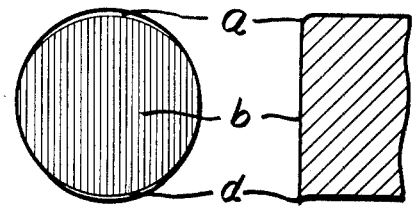
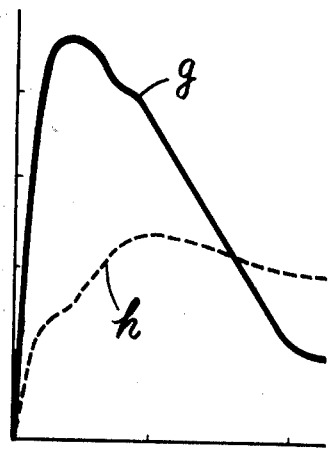
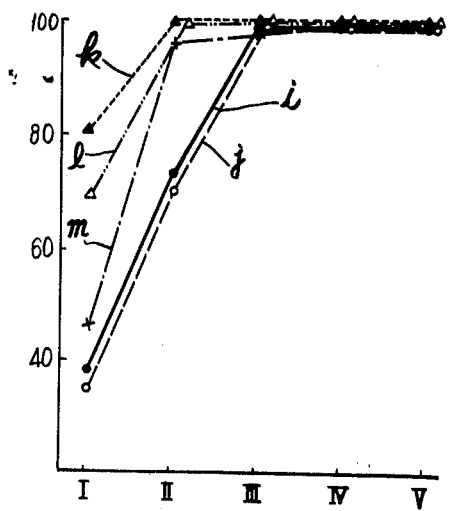

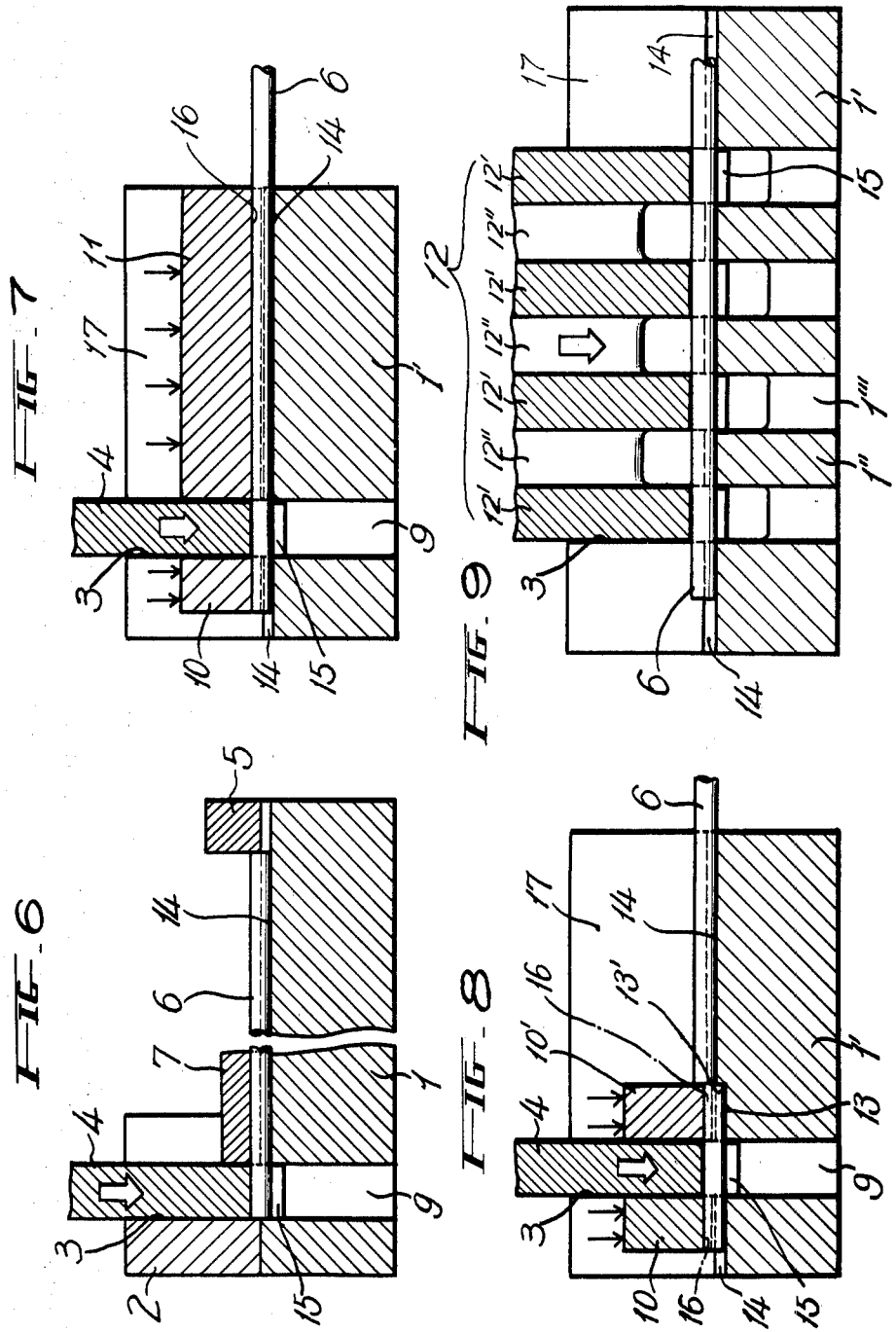

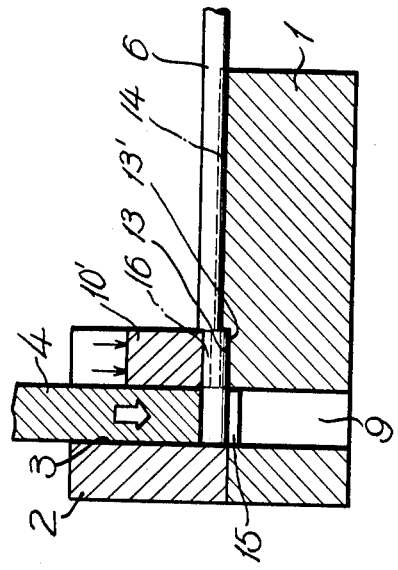
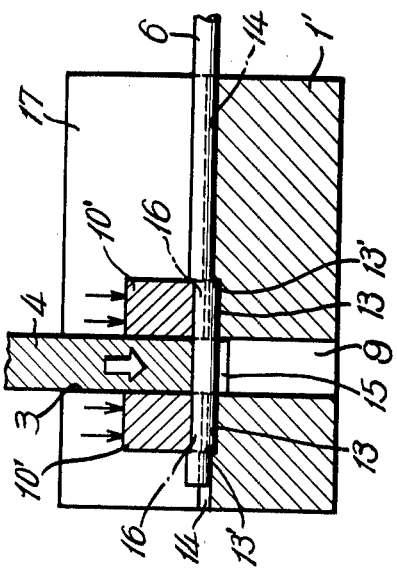
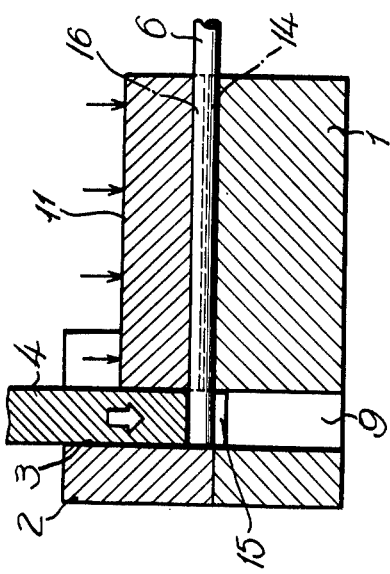
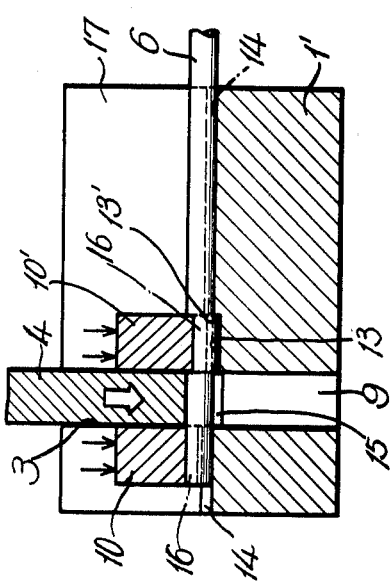

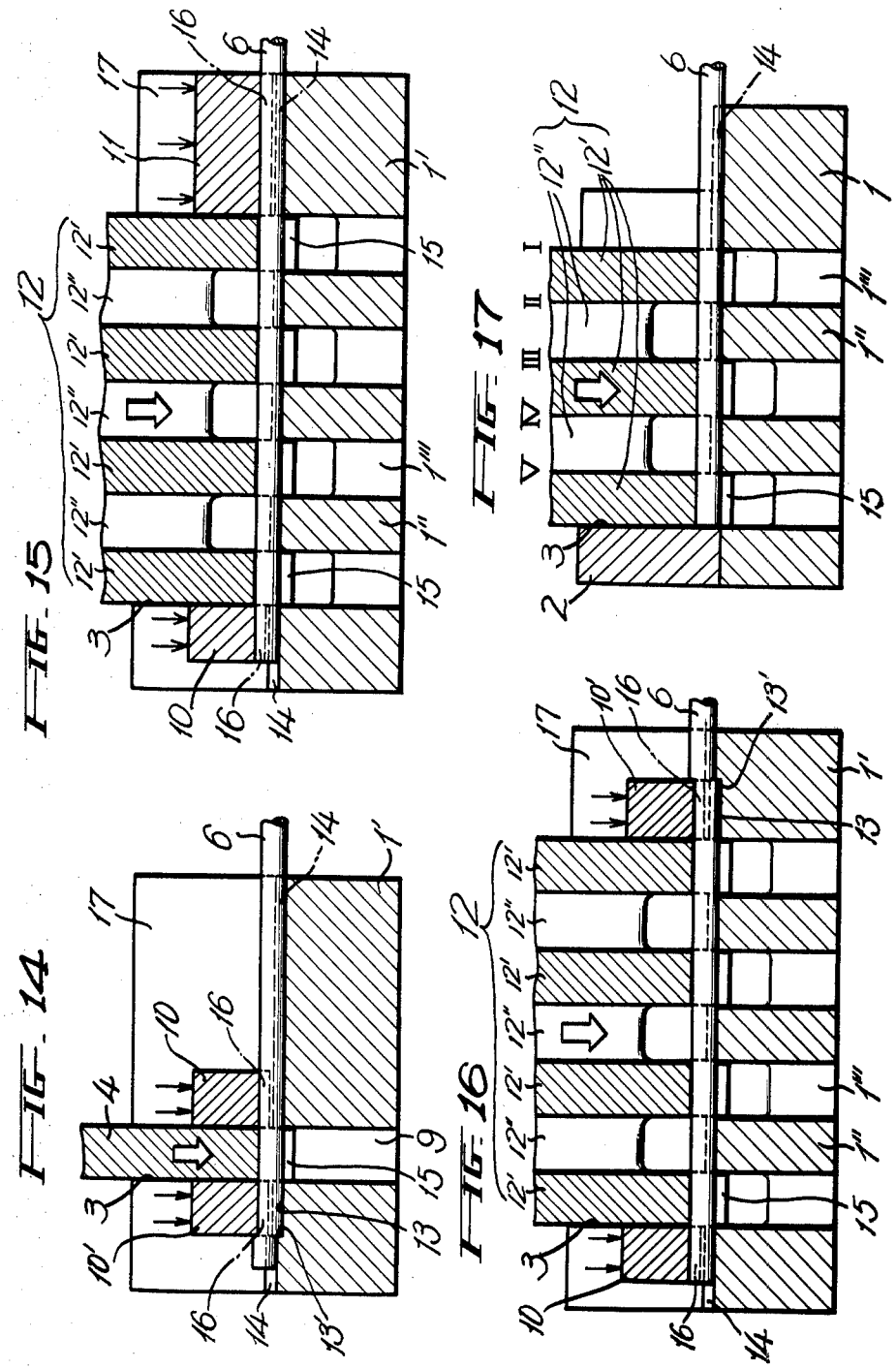

3,590,674

RESTRAINED SHEARING METHOD OF BAR MATERIAL

BACKGROUND OF THE INVENTION

The present invention relates to the shearing of bar material and more particularly to the restrained shearing of bar material, wherein bar material, especially a long-sized bar with a continuously similar cross sectional cut face in sheared smoothly and precisely at right angles without any broken portions.

In the cutting of bar material, the methods used have been grinding, cutting by a grinder, cutting-off by lathe, sawing by a sawing machine or shearing by a press. Among these methods shearing by press, when compared with the other methods, has a better working speed and high productivity with no material loss, however, it is the poorest in regard to precision of the final products. Taking for example the sheared state of rounded bar material in FIG. 1, there is a rounded portion $a$; a smooth sheared face $b$; a broken portion $c$; a rolled/up portion $d$; and an indented piece $e$ and in view of the precision of sheared surface, the sheared face $b$ is the only good part. Moreover as the material is twisted at the moment of cutting in the course of shearing, the sheared surface will not be level, and this surface is not at right angles to the axial direction, and the sheared material is rough and uneven. On account of such defects in precision, sheared workpieces are seldom used in the sheared state. Generally the cut end is removed by cutting and grinding off or corrected by rubbing or later processings. Consequently, this manner of producing material is not too popular especially in the field of cold forging, where a high production is required.

The present concept has been achieved after earnest studies and various experiments in view of the above-mentioned circumstances, adopting the advantages of press cutting, and eliminating its defects. Thus, the fundamental objective of this invention is obtaining usable materials from bar workpieces especially a long-sized workpiece to obtain smooth cut faces without broken portions and with high precision of right-angle cuts, avoiding defects in the precision of the sheared faces, and further with no loss of material. For this purpose, the present inventive concept contemplates the shearing of material, the axial movement of which is being restrained.

BRIEF EXPLANATION OF THE DRAWINGS

FIG. 1 shows an example of a sheared face of round bar material obtained by a conventional press shearing method;

FIG. 2 is an explicative drawing of shearing bar material by adding compressive force in the axial direction of bar material;

FIG. 3 shows the moving direction of bar material which is sheared, clearance being zero;

FIG. 4 shows a diagram of shearing resistance and axial compressive stress relative to shearing pressure stroke when the axial removal of bar material is restrained and sheared, the bar material being SAE-5140 (AISI-5140);

FIG. 5 shows the sheared face of rounded bar material by the restrained shearing method according to the present invention;

FIG. 6 to FIG. 17 are vertical sectional side views which show embodiments of the restrained shearing method of the present invention, wherein;

FIG. 6 shows the shearing method using shearing pressure by holding both ends of bar material to fixed members;

FIG. 7 shows the shearing method using shearing pressure by pressing both ends of bar material vertically against the axial direction of bar material;

FIG. 8 shows the shearing method using shearing pressure by pressing both ends of bar material vertically against the axial direction and partially shearing the bar material at the right side of the right pressure component;

FIG. 9 shows the shearing method, in which bar material put on a base is sheared by applied shearing pressure using a plurality of cutting edges;

FIG. 10 shows the shearing method, wherein one end portion of bar material is made to contact a fixed member, pressing the center portion thereof vertically against the axial direction, thereby shearing the bar material by means of the shearing pressure;

FIG. 11 shows the shearing method, in which one end portion of bar material is held by a fixed member, and shearing is performed while the center part is partially sheared and pressed by means of the shearing pressure;

FIG. 12 shows the shearing method, in which the two shearing pressure means are so provided as to press both sides of bar material vertically against the axial direction and the right side pressure partially shears bar material;

FIG. 13 shows the shearing method, in which two shearing pressures are so provided as to press both sides of bar material vertically against the axial direction and the both pressure shears and presses a part which depresses a little more than the end portion of the bar material;

FIG. 14 shows the shearing method, wherein shearing pressures are so provided as to press both sides of bar material vertically against the axial direction, and two pressure means press a part which depresses a little more than the end portion of the bar material as well as where the right side pressure partially shears bar material;

FIG. 15 shows the shearing method, in which both sides of bar material are pressed vertically against the axial direction, and the shearing pressure formed by using a plurality of cutting edges shears the part between both pressed sides;

FIG. 16 shows the shearing method, in which both sides of bar material are pressed vertically against the axial direction by means of two shearing pressures, and at the same time bar material is partially sheared at the right side by right pressure and shearing pressure using a plurality of cutting edges which shears a part between both shearing pressures;

FIG. 17 shows the shearing method, in which one end of bar material is made to contact a fixed member, and shearing is performed by means of the shearing pressure using a plurality of cutting edges; and, FIG. 18 is a diagram showing the shearing rates on the sheared surfaces which are obtained by the shearing method of FIG. 17, in which shearing is performed with test materials which have different properties.

DETAILED DESCRIPTION

The inventors have discovered through their studies and experiments that the cut defects and irregular surfaces, especially the occurrence of broken portions in the sheared face are generally caused by the fact that when shearing is performed under the condition that clearance of the shearing pressure means is close to zero, the workpiece is forced to swell out as if a wedge is driven into it and the pointed wedge end acts as a cutting edge to divide the workpiece. Thereupon the eliminate such defects, the bar material is restrained from movement in the axial direction, i.e. if shearing is performed under the condition of restraining the movement of the bar material, the bar material produces high compressive stress in itself because it is prevented from releasing this energy in the axial direction. This compressive stress increases the extensibility of bar material, thereby supressing cracks occurring from the cutting-edge, so that smooth sheared faces can be obtained without broken portions.

FIG. 4 shows a test example of this compressive stress; Diagram $g$ (shearing pressure stroke)-(shearing resistance), and diagram $h$ (shearing pressure stroke)-(compressive stress in the axial direction) at the time when a round bar workpiece 10 mm. in diameter (SAS-5140 or AISI-5140) is restrained and is statically sheared by using shearing pressure means having a half-circular cutting edge of zero clearance. It is clearly noted through this test example that fairly high compressive stress in the axial directions arises by restraining bar material.

Considering actual restraining methods the following methods can be used;

1. Contacting or holding both ends of bar material with a fixed member, thereby restraining the axial movement of the bar material (refer to FIG. 6);

2. Adding vertical force to both sides of the bar material, so as to restrain the axial movement of the bar material (refer to FIG. 7);

3. The method No. 2 above which partially shears bar material, and restrains the axial movement of bar material by contacting the sheared part and the pressing means (refer to FIG. 8); and, 4. A method which simultaneously shears bar material by means of the shearing pressure using a plurality of cutting edges, thereby restraining the axial movement between cutting edges (refer to FIG. 9).

Various kinds of restraining arrangements can be used by combining these methods. These embodiments will be explained in accordance with drawings;

FIG. 6 shows that member 2 is fixed on the upper surface of base 1 having passage 9; vertical grooves 3 formed in said fixed member 2 with respect to the upper surface of the base 1; shearing pressure 4 is provided by a ram (not show) which is slidably inserted with a clearance close to zero in passage 9; and further fixed member 5 is so provided that this member can be adjusted on another side of the base 1 as desired. The base 1 is used for placing the bar material 6 thereon and is formed with concave groove 14 in order to securely fit the bar material thereon. A pressing surface used for shearing pressure is equipped with concave face 15 the shape of which corresponds to the sectional shape of the bar material. If the bar material is round, the concave face is formed as a half-circle. To shear bar material, the material 6 which is to be sheared is inserted in the concave-shaped groove 14 on the base 1 between fixed members 2 and 5, with both end portions thereof in contact with said fixed members 2, 5, thereby restraining the axial movement. The shearing is done by the shearing pressure means 4.

FIG. 7 shows that the base 1' having a groove portion 17 with a groove 3 in the upper two sides of passage 9 in order to obtain free slide movement of the shearing pressure means 4 (clearance is close to zero); there are provided side pressure means 10, 11 with grooves 3 therebetween and which press vertically against the axial direction of the bar material. The pressing faces of these side pressure means 10, 11 are provided with a concave portion 16 which corresponds to the sectional shape of the bar material; bar material 6 put on the base 1' is pressed by these pressures 10, 11, and the axial direction of bar material is restrained by the friction of the pressing faces. Then, the shearing pressure means 4 shears the bar material. In this connection, if such means are adopted which increase roughness or uneveness of the pressing surface of the side pressure means, 10, 11 or if the pressing surface is in the form of a large half-circle, when the bar material is pressed, movement in the axial direction, will be reduced owing to increase of friction.

FIG. 8 shows an arrangement wherein a stepped surface 13 is formed in the bottom of a groove portion 17 on the base 1' having passage 9. Grooves 3 for guiding the shearing pressure 4 are formed in both the upper sides of passage 9 in order to obtain free sliding of the shearing pressure means 4. Clearance is close to zero. Further, there are arranged pressure means 10, 10' which have grooves 3 therebetween. There is also a groove portion 16 pressing bar material 6 vertically against the axial direction. Furthermore, the width of said pressure means 10' is such that it corresponds to the stepped surface 13 and has the right side of the pressure 10' so disposed that it is placed approximately just above the stepped portion 13' of the stepped surface 13. In this structure, bar material 6 on the base 1' is partially sheared by pressure means 10' so that no crack occurs, and the axial movement of bar material is restrained by the pressing force of the pressures 10, 10' and the engagement of the stepped portion 13' and the sheared surface obtained by said partially shearing, and under such restrained condition shearing is performed by means of the shearing pressure means 4. The pressing force on the bar material can be reduced because of the engagement of the sheared surface and the stepped portion 13'.

The arrangements shown in FIG. 6 to FIG. 8 perform shearing under the condition of restraining the axial movement of bar material so that at the time of shearing even if bar material 6 is as shown in FIG. 3 forced to swell out as if a wedge is driven in, i.e., as if the pointed end of a cutting edge is used, the bar material 6 creates within itself a high compressive stress, because of restraining the bar material against movement. Since this compressive stress increases the extensibility of the bar material and completely checks cracks arising near the outting-edge, the sheared surface of bar material taken out of passage 9 of base 1 will be smooth without broken portions. Since, when the bar material is of long-sized, there is a fear that the bar material may be curved by the axial pressure which occurs at shearing, a guide sleeve 7 for inserting bar material is provided in base 1 opposite to the fixed member 2. Thus when the bar 6 is sheared, and restrained against movement, a smooth sheared surface can be obtained, but a smooth sheared surface is also obtained when using the method of restraint and shearing pressure against movement in the axial direction. That is, the arrangement shown in FIG. 9 there is arranged on the upper part of base 1' shearing pressure means with a plurality of cutting edges which move in the direction of the arrow; and said shearing pressure means 12 is alternatively equipped with press bars 12' extending over the sheared length of the bar material and blankspaces 12', while in the base 1' are vacant spaces 1' corresponding to press bars 12' and receiving spaces 1'' to the vacant spaces 12''. In this method, bar workpiece 6 is not restrained by means of the shearing pressure means 12. The bar is sheared by the pressure 12' and the receiving spaces 1'' and although parts of bar material between pressure means 12', 12' at times tend to move in the axial direction, the pressure means 12'', 12'' and receiving spaces 1'' check it so that strong compressive stress arises at these part, thereby making the sheared surface smooth. Although broken surfaces are created on the both sides, the movement in the axial direction of which cannot be restrained, this method can produce a plurality of sheared bars at the same time, and is suitable for mass-production, though it produces bad sheared bar sections in the end pieces.

FIG. 10 to FIG. 17 show embodiments of restrained shearing of bar material obtained by combination of the foregoing methods. FIG. 10 shows that fixed member 2 is provided on the upper side of base 1 having passage 9, and fixed member 2 is formed with grooves 3 in the upper two sides of passage 9 so as to obtain free sliding of the shearing pressure means 4, clearance being close to zero, and further there is provided second pressure means 11 which presses bar material 6 vertically against the axial line of bar material opposite to groove 3 of fixed member 2. In this method, movement of bar material 6 is checked by the fixed member and the pressure means 11 so that shearing can be performed.

FIG. 11 show that fixed member 2 is disposed on the upper left side of base 1 having passage 9 and forming a stepped surface 13, and fixed member 2 is formed with grooves 3 in the two upper sides of passage 9 so as to insert slidably the shearing pressure means 4. Clearance is close to zero. On the right side of fixed member 2 there is additional groove 3. Pressure 11' presses bar workpiece 6 vertically against the axial line thereof. Furthermore there is additional pressure means 10' with a width corresponding to the pitch of the bar workpiece 6, and its right side extends so that it is approximately just above the stepped portion 13' of the stepped surface 13. When one end of bar material 6 on the base 1 contacts fixed member 2, pressure means 10' moves down in the direction of the arrow to partially shear press the bar workpiece 6 movement is to be completely checked in the axial direction by member 2, the pressing force of the pressure means 10' and the engaging of the sheared surface which is obtained by partial shearing with stepped portion 13'.

The arrangements shown in FIG. 12 to FIG. 14 are variations of embodiments of FIG. 8, in which FIG. 12 shows that stepped surface 13 is formed at the right side of passage 9 of the base 1', and this partially shears only the center portion of the bar workpiece 6 on the base 1', and the pressing force by pressures means 10, 10' and the contact of stepped portion 13' restrains the axial movement thereby shearing bar workpiece 6.

FIG. 13 shows that pressing and shearing take place by means of both pressure means 10', 10' in a part which gets in a little more than the end portion, and there are on base 1' stepped portions 13', 13' at the both sides of the stepped surface 13 and the sides of pressure means 10' are placed just above these portions 13', 13'. If bar workpiece 6 is pressed by means of the pressure means 10', 10 and at the same time that partial shearing is effected on the both sides, the axial movement of bar material 6 is restrained by pressure of bar material and the contacts of both stepped portions 13', 13'.

FIG. 14 shows that bar workpiece 6 is pressed by means of both pressure means 10', 10' at a part a little removed from the end portion of bar material 6, and in this case partial shearing of bar material is also accomplished at the left side by pressure means 10'.

FIG. 15 show that the pressure means 10, 11 arranged at the both sides of the shearing pressure means 12 shown in FIG. 9; bar workpiece 6 on the base 1' is pressed by means of the pressure means 10, 11 vertically against the axial line of bar material 6, and under the condition of restraining movement of bar workpiece in the axial direction. The shearing pressure means 12 has a plurality of cutting-edges which shear the bar. This method is the same as shown in FIG. 9 except that bar material 6 is sheared by the shearing pressure means 12' and the receiving spaces 1'', and at that time, parts of bar material between shearing pressure means 12', 12' are restrained against movement by the shearing pressure means 12'', 12'' and receiving spaces 1''. Since the both ends are restrained against movement in both directions, all sections sheared at the same time have smooth sheared faces.

The embodiment shown in FIG. 16 uses the shearing pressure means 12 with a plurality of cutting edges instead of the shearing pressure 4 in FIG. 8; bar workpiece 6 is partially sheared in one portion by pressure means 10' so that there is no crack. The axial movement thereof restrained by the stepped portion 13' and force of the pressures means 10, 10' so that simultaneous shearing takes place under restraint.

FIG. 17 shows the use of shearing pressure means with a plurality of cutting-edges instead of the shearing pressure means 4 of FIG. 6. In this case also, one end portion of bar material 6 is held by fixed member 2. Shearing is performed differently from the case of FIG. 9 because the end portion of bar material 6 is restrained from movement in the axial direction, resulting in creating a large broken portion only in the part sheared at I by the pressure means 12' and consequently enabling an improved yield. FIG. 18 shows the results when bars of materials 10 mm. in diameter are sheared. Soft steel is $i$, chrome steel $j$, pure aluminum $k$, pure copper $l$ and yellow copper $m$. These materials are sheared as shown herein using pressure means 12 of zero clearance. According to this figure, it is noted that all sheared surfaces are effected in cases II, III, IV or V. In this connection, when the shearing pressure means 12 with a plurality of cutting edges is used instead of the shearing pressure means 4 in FIG. 6. (this case not being shown) sheared pieces can be made to have smooth sheared surface, since bar material 6 is held by fixed members 2, 5.

It is to be observed therefore that as a bar workpiece is restrained against axial movement and one end portion is held by a fixed member to prevent the bar workpiece from moving and to fix the position for shearing, the pressure partially shears the workpiece in order to press, thereby enabling use of a lower pressing force, and moreover if such partial shearing of bar material is stopped while the shearing process goes on. The sheared part is strong enough to manufacture products such as crank shafts. The pressing structure used to press vertically against the axial line of the bar workpiece works in the same direction as the shearing means using the shearing pressure, and these components are close to each other so that their cooperation is easy achieved. When a plurality of cutting edges are used, no pressure becomes necessary. Sheared material obtained by the present invention has smooth sheared surfaces at a highly precise right angle, and is superior to results obtained by conventional means so that no further processing is required. Bars to be sheared by this method may be not only round but also square as well as irregular or tube shaped. This invention can be applied not only to metal but also to nonmetals such as plastics.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A method of shearing bar material comprising the steps of placing one end of said bar workpiece against a rigid fixed abutment, applying a restraining force to an area of said workpiece normal to the longitudinal axis thereof but spaced from said abutment, said area of the workpiece resting on a fixed support with the force being applied to a pressure member serving to grip said workpiece against said fixed support to restrain axial movement thereof, and applying a shearing force to said workpiece between the abutment and said support and pressure member by means of a shearing member having a clearance between the abutment and the fixed support and pressure member of substantially zero.